United States Patent [19]

Brown

[11] 4,260,052
[45] Apr. 7, 1981

[54] VIBRATORY FEEDER LEAF SPRING ARRANGEMENT

[75] Inventor: William R. Brown, Blairsville, Pa.

[73] Assignee: FMC Corporation, San Jose, Calif.

[21] Appl. No.: 912,806

[22] Filed: Jun. 5, 1978

[51] Int. Cl.³ ............................................. B65G 27/08
[52] U.S. Cl. .................................................... 198/763
[58] Field of Search ......................................... 198/763

[56] References Cited

U.S. PATENT DOCUMENTS

| 3,032,175 | 5/1962 | Thomas | 198/763 |
| 3,165,197 | 12/1965 | Allen et al. | 198/763 |
| 3,216,556 | 11/1965 | Burgess, Jr. | 198/763 |
| 3,347,352 | 10/1967 | Gwinn, Jr. | 198/763 |

Primary Examiner—Robert B. Reeves
Assistant Examiner—Brian Bond
Attorney, Agent, or Firm—J. W. Edwards

[57] ABSTRACT

A vibratory feeder has an elongated base assembly that is supported on a foundation by longitudinally spaced vibration isolators. Projecting upwardly from the base assembly at longitudinally spaced locations are a plurality of leaf springs with upper portions that support a trough assembly. The base and trough assemblies have masses, with the centers of these masses being spaced apart along an upwardly extending axis. The trough assembly is driven transversely of the upwardly extending axis by a driver. The assembly masses create inertia forces acting at the mass centers, and these forces form a force couple urging a rotational motion on the feeder as a whole. The leaf springs are arranged to deflect along non-parallel paths to guide the trough assembly in both curvilinear translation and rotation with respect to the base. This rotation opposes the rotational urge created by the inertia force couple to thereby eliminate rotational motion of the trough with respect to the foundation, so that the trough moves only in curvilinear translation with respect to the foundation.

3 Claims, 8 Drawing Figures

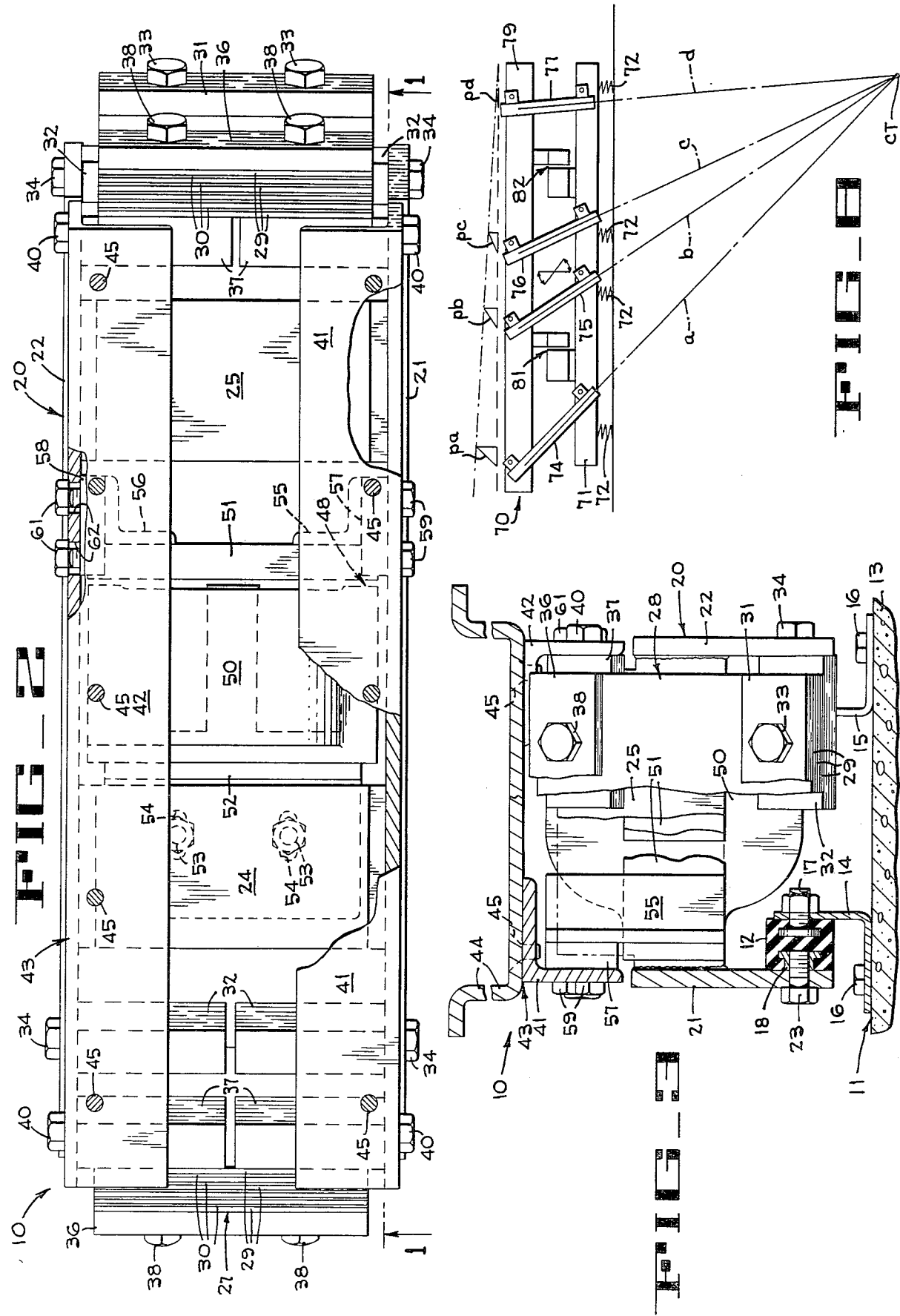

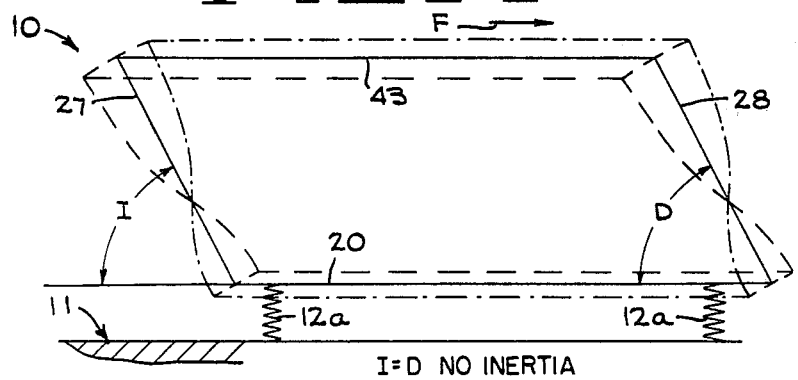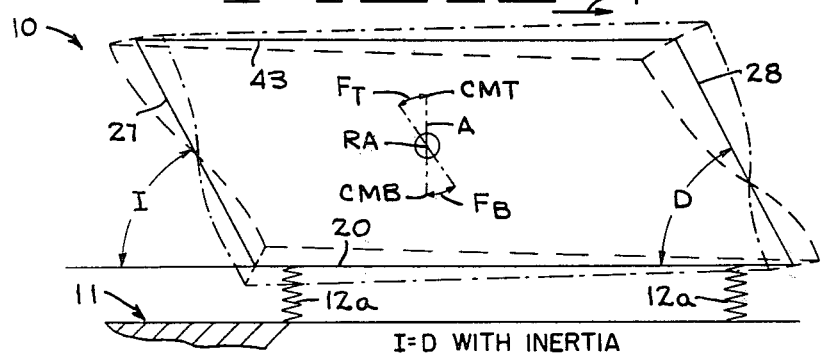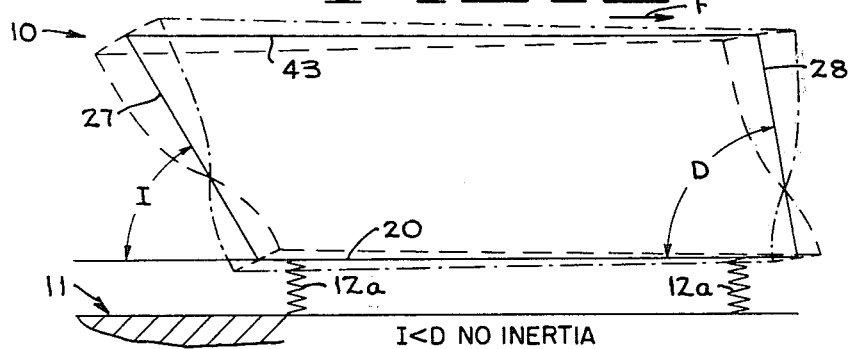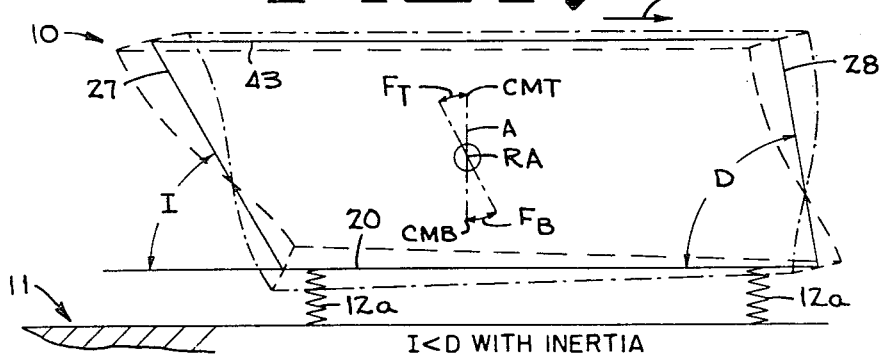

VIBRATORY FEEDER LEAF SPRING ARRANGEMENT

BACKGROUND OF THE INVENTION

1. Field of the Invention

This invention relates to vibratory feeders or conveyors. More specifically, it concerns the arrangement of leaf springs that extend upwardly from a base assembly to support a trough assembly for vibratory movement.

2. Description of the Prior Art

Known vibratory feeders have an elongated base assembly that is supported on a foundation by longitudinally spaced vibration isolators. A plurality of leaf springs, projecting upwardly in parallel relationship from the base assembly, at longitudinally spaced locations, support at their upper portions a trough assembly. Both assemblies have masses, with the centers of mass being spaced apart along an upwardly extending axis. The trough assembly is driven transversely of this axis by a driver. The assembly masses create inertia forces, acting at their centers, to form a force couple, that urges a rotational motion on the feeder as a whole. This rotational motion tends to pitch the feeder longitudinally upon the vibration isolators, and thus, creates a problem. It is desirable to have the trough assembly move with a translation motion throughout its vibration cycle and with a substantially uniform amplitude and direction of vibration to facilitate feeding between adjoining input and discharge structures.

SUMMARY OF THE INVENTION

The purpose of this invention is to compensate for rotational motion on a vibratory feeder, resulting from inertia forces, so that the feeder trough assembly moves with a translation motion relative to a foundation throughout its vibration cycle. This is achieved by arranging the leaf springs, that extend between the base and the trough assemblies, to deflect along non-parallel paths to guide the trough assembly in both curvilinear translation and rotation relative to the base assembly. This rotation of the trough assembly relative to the base assembly occurs in a direction opposite to the rotational motion of the whole feeder on the foundation created by the inertia forces.

A vibratory feeder has an elongated base assembly with a plurality of vibration isolators supporting the base assembly on a foundation at longitudinally spaced locations. At least three leaf springs project upwardly from the base assembly at locations spaced longitudinally thereof. A trough assembly is supported by the upper portions of the leaf springs. Both assemblies have masses, with the centers of these masses being spaced apart along an upwardly extending axis. When a driver drives the trough assembly relative to the base assembly, in a direction transversely of the upwardly extending axis between the centers of mass, the assembly masses create inertia forces acting upon the center of mass of each assembly, to form a force couple that imposes a rotational motion on the feeder as a whole, including the base assembly, tending to pitch the feeder longitudinally upon the vibration isolators. Means are provided for mounting the leaf springs to extend in non-parallel relationship between the assemblies with extension lines from each leaf spring converging to meet at a common point that is the torsional center of vibration. The leaf springs are arranged between the assemblies for deflection along non-parallel paths to guide the trough assembly in both curvilinear translation and rotation, relative to the base assembly. This rotation of the trough assembly relative to the base assembly occurs in a direction opposite to the rotational motion of the whole feeder created by the inertia force couple, thereby eliminating rotation of the trough relative to the foundation so that the trough moves relative to the foundation only in curvilinear translation.

BRIEF DESCRIPTION OF THE DRAWINGS

FIG. 2 is a horizontal section, taken on the line 2—2 of FIG. 1, with portions broken away to show underlying structure.

FIG. 3 is a transverse section, taken on the line 3—3 of FIG. 1, with portions broken away.

FIG. 4 is a schematic diagram illustrating the mechanical motion of the feeder, shown in FIG. 1, when the leaf springs are parallel and inertia forces are not considered.

FIG. 5 is a schematic diagram illustrating the mechanical motion of the feeder when the leaf springs are parallel and inertia forces are considered.

FIG. 6 is a schematic diagram illustrating the mechanical motion of the feeder, when the leaf springs are arranged in non-parallel relationship and when inertia forces are not considered.

FIG. 7 is a schematic diagram illustrating the mechanical motion of the feeder, when the leaf springs are arranged in non-parallel relationship and when inertia forces are considered.

FIG. 8 is a schematic diagram of a vibratory feeder embodying a modified form of the invention.

DESCRIPTION OF THE PREFERRED EMBODIMENT

Figure 1:
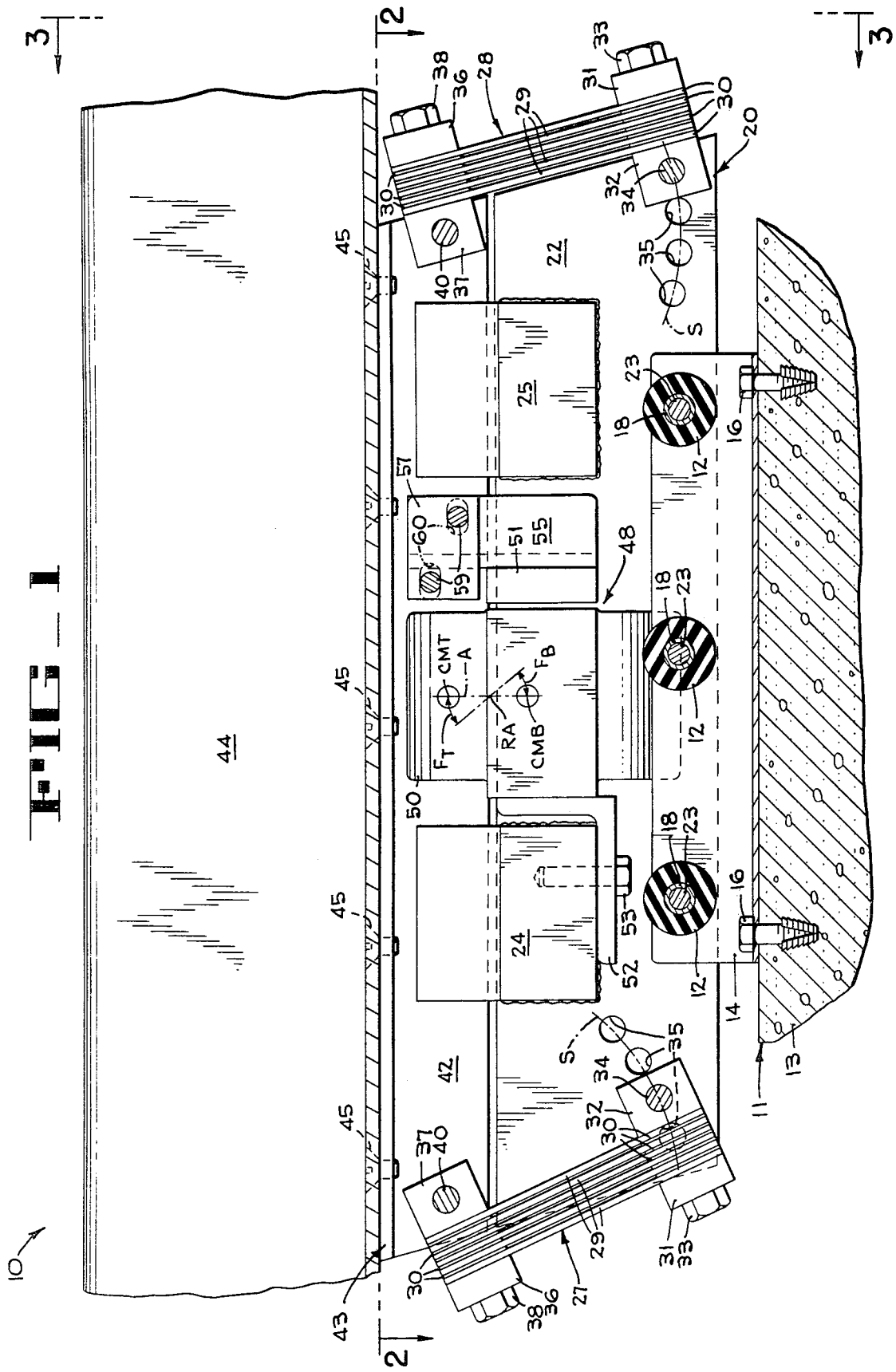
FIG. 1 is a vertical longitudinal section, taken on the line 1—1 of FIG. 2, of a vibratory feeder embodying the present invention.

Looking now at FIGS. 1 and 3, a vibratory feeder 10 is mounted to a foundation 11 by vibration isolators 12. The foundation includes a concrete slab 13, to which a pair of mounting angles 14 and 15 are secured by anchor screws 16. The vibration isolators have a generally cylindrical shape. These isolators are connected to the upstanding legs of the mounting angles by stud bolts 17 that project axially outward from one end of the isolators. Internally threaded sleeves 18 are coaxially embedded within the isolators at ends opposite from the stud bolts. The vibration isolators are made of an elastomeric material, such as rubber, that deflects under loading. The isolators are spaced longitudinally of the mounting angles.

The vibratory feeder 10 has an elongated base assembly 20 that is supported by the vibration isolators 12. The base assembly includes a pair of side plates 21 and 22. Cap screws 23 fit through these side plates into the sleeves 18 for attaching the base assembly to the vibration isolators. A pair of weight blocks 24 and 25 are welded transversely between the side plates. Near the top portion of the side plates, these weight blocks are indented laterally inward, as shown in FIG. 3. Thus, the weight block portions that extend upwardly from the side plates are narrower than the transverse dimension between the side plates. The purpose of the weight blocks is to raise the center of mass of the base assembly, indicated as CMB.

A plurality of leaf springs 27 and 28 project upwardly from opposite ends of the base assembly, as shown in FIG. 1. Each leaf spring includes a set of leaves 29 that are separated by spacers 30. At both sides of the feeder, the lower portions of the leaves are held in place between clamps 31 and mounting brackets 32 by transversely extending cap screws 33. The mounting brackets are fastened to the side plates 21 and 22 by cap screws 34. These screws fit into one of a series of openings 35 in the side plates. The openings are aligned at spaced locations along arcs S that will be defined later. Preferably, there are four openings in each series, and each pair of adjacent openings are spaced apart by an arc angle of approximately 10 degrees. Thus, these mounting brackets are selectively positionable. At both sides of the feeder, the upper portions of the leaves are held in place between clamps 36 and mounting brackets 37 by transversely extending cap screws 38.

The mounting brackets 37 are fastened by cap screws 40 to a pair of trough mounting brackets 41 and 42, that are part of a trough assembly 43. The mounting brackets 37 can pivot about the cap screws 40 for adjusting the leaf springs 27 and 28 to a desired inclination, where the selectively positionable mounting brackets 32 are aligned with a desired opening 35. The arcs S along which the series of openings are located are defined by the distance between the centers of the mounting bracket openings for the cap screws 40 and 34, as the leaf springs pivot about the cap screws 40. The trough mounting brackets have legs extending both vertically and horizontally. The trough assembly has a trough 44, that is fastened to the horizontally extending legs of the trough mounting brackets by flat-headed screws 45, which are countersunk within the bottom of the trough. The trough could also be fastened to the trough mounting brackets by means of welding. Thus, the trough assembly is supported by the upper portions of the leaf springs. The trough assembly has a center of mass CMT, that is spaced from the base assembly center of mass CMB along an upwardly extending axis A, that may or may not be vertical.

A driver 48 is coupled to the trough assembly 43 for driving the trough assembly relative to the base assembly, in a direction transversely of the upwardly extending axis A. The driver has a core assembly 50 and an armature 51. The core assembly is attached to a bracket 52, that is coupled to the weight block 24 by a pair of bolts 53, shown in FIG. 2. These bolts pass through slotted openings 54 in the bracket. The armature is attached to a pair of vertically extending angles 55 and 56, that have mounting blocks 57 and 58 attached to their upper ends. The mounting block 57 is supported by a pair of cap screws 59, that project through a pair of elongated openings 60 in the mounting bracket 41. The mounting block 58 is supported by a pair of cap screws 61 that project through elongated openings 62 in the mounting bracket 42.

With reference to FIGS. 4–7, the vibrator feeder 10 operation will now be described. These figures are schematic diagrams which illustrate the feeder in a neutral position, as either a parallelogram or a trapezoid shown in solid line. The direction of feed is illustrated by the arrow F. The dot-dash line illustrates the deflected position of the feeder at the end of a feeding stroke, and the dash line illustrates the deflected position of the feeder at the end of a return stroke. The feeder is mounted upon vibration isolators 12a that are shown as coil springs for simplicity. Such isolators would operate in the same manner as the vibration isolators 12 that are made of elastomeric material.

FIG. 4 illustrates the mechanical motion of the feeder 10 when the input end spring angle I and the discharge end spring angle D are equal, and if there were no inertia forces exerted on either the base assembly or the trough assembly. The trough assembly 43 and the base assembly 20 would move in curvilinear translation relative to the foundation 11. Such motion for the trough assembly is desired to obtain a substantially uniform feeding action on the trough from input to discharge ends, but cannot be achieved in the manner shown in FIG. 4 because inertia forces are present on the base assembly and the trough assembly.

The masses of the trough assembly 43 and the base assembly 20 have centers CMT and CMB, as shown in FIG. 5, that are spaced apart along the upwardly extending axis A. As the assemblies vibrate, their masses create inertia forces acting on the centers in opposite directions to form an oscillating force couple (made up of forces $F_T$, which acts on the center of mass of the trough assembly CMT, and force $F_B$, which acts on the center of mass of the base assembly) that imposes a moment about rotational axis RA on the feeder as a whole. The moment tends to pitch the whole feeder assembly including the trough as one rigid body longitudinally relative to the foundaton upon the vibration isolators 12a. If the spring angles I and D are equal, no pitching of the trough assembly will occur relative to the base assembly. The trough assembly 43, therefore, will not move in the desired curvilinear translation relative to the foundation throughout the vibration cycle. Instead, the trough assembly would move relative to the foundation with a combined motion of rotation and curvilinear translation.

When the leaf springs 27 and 28 are arranged in non-parallel relationship (that is, with unequal angles) and when inertia forces are not considered, as shown in FIG. 6, the trough assembly 43 moves relative to the base assembly with a mechanical motion that is a combination of curvilinear translation and rotation. The input end spring angle I is less than the discharge end spring angle D. These spring angles are vertical angles between the leaf springs and a line extending longitudinally of the base assembly. The angles face in a direction that is opposite the direction of feed F and upwardly towards the trough assembly. If inertia forces are ignored, the base assembly moves relative to the foundation with a mechanical motion that is a combination of curvilinear translation and rotation, as shown in FIG. 6.

When, as shown in FIG. 7, the trough assembly has a mechanical motion relative to the base assembly (due to the difference in spring angles I and D) and the whole feeder assembly has a rotational motion relative to the foundation (due to inertia forces), the rotational motion of the trough assembly relative to the base assembly that is created by the leaf springs being arranged in non-parallel relationship is equal in magnitude and opposite in direction to the rotational motion of the whole feeder assembly relative to the foundation that is created by the inertia force couple. Thus, the rotational motions of the trough assembly cancel out. The trough assembly moves relative to the foundation in substantially curvilinear translation throughout each vibration cycle and has a substantially uniform amplitude and direction of vibration.

The leaf springs 27 and 28 are adjustably mounted so that the proper spring angles I and D can be set for various trough assembly 43 masses. To adjust the leaf springs, looking again at FIG. 1, a cap screw 34 is removed from an opening 35. The mounting bracket 37 pivots about the cap screw 40, as the leaf spring is swung through an arc, to position the mounting bracket 32 for insertion of the cap screw into a desired opening 35.

FIG. 8 schematically illustrates a modified form of the invention. A feeder 70 has a base assembly 71 that is mounted upon vibration isolators 72. Leaf springs 74, 75, 76 and 77 project upwardly from the base assembly and support at their upper ends a continuous trough assembly 79. Drivers 81 and 82 are provided for moving the trough assembly longitudinally relative to the base assembly. The leaf springs are arranged in non-parallel relationship between the assemblies. The extension lines a, b, c and d from each leaf spring converge to meet at a common point CT. This point is the torsional center of vibration. The leaf springs deflect along non-parallel paths pa, pb, pc, and pd to guide the trough assembly to the dot-dash line position. This arrangement of the leaf springs enables the trough assembly to move with curvilinear translation and rotation, without bending the trough assembly. Such rotation tends to cancel the rotation caused by inertia forces acting upon the trough and base assemblies. Thus, the trough assembly moves relative to the foundation with curvilinear translation throughout its vibration cycle and has a substantially uniform amplitude and direction of vibration.

From the foregoing description, it will be seen that the vibratory feeders 10 and 70 have trough assemblies 43 and 79 that are supported by leaf springs 27-28 and 74-77. These leaf springs are arranged between the base assembly and the trough assembly for deflection along non-parallel paths to guide the trough assembly relative to the base assembly in curvilinear translation and in rotation. Such rotation is opposing the rotation urge created by an inertia force couple on the feeder as a whole. Thus, the rotational motions on the trough assemblies cancel out, and the trough assemblies move with curvilinear translation only relative to the foundation throughout their vibration cycles.

Although the best mode contemplated for carrying out the present invention has been herein shown and described, it will be apparent that modification and variation may be made without departing from what is regarded to be the subject matter of the invention.

What is claimed is:

1. In a vibratory feeder for mounting to a foundation, said feeder having an elongated base assembly, at least three leaf springs projecting upwardly from the base assembly at longitudinally spaced locations, a trough assembly being supported by the upper portions of the leaf springs, said assemblies having masses with the centers of these masses being spaced apart along an upwardly extending axis, and a driver for driving the trough assembly relative to the base assembly in a direction transversely of the upwardly extending axis, said masses creating inertia forces acting upon the centers of mass of the assemblies to form a force couple that imposes a rotational motion on the feeder as a whole including the base assembly which tends to pitch longitudinally, the improvement comprising a plurality of vibration isolators spaced longitudinally of the base assembly for resiliently supporting the feeder on the foundation and isolating vibrations therefrom, said vibration isolators deflecting to permit the base assembly to pitch relative to the foundation in response to the rotational motion on the feeder as a whole, and means mounting the leaf springs to extend in non-parallel relationship between the assemblies with extension lines from each leaf spring converging to meet at a common point that is the torsional center of vibration, whereby the leaf springs deflect along non-parallel paths to guide the trough assembly in a combined motion having components of curvilinear translation and rotation relative to the base assembly, said rotation of the trough assembly due to leaf spring deflection occurring in a direction opposite to the rotational motion of the whole feeder assembly including the trough assembly created by the inertia force couple, whereby the leaf springs compensate for the rotational motion of the feeder and trough created by the force couple and thereby maintain the trough assembly parallel to the foundation.

2. The feeder described in claim 1 further improved by another driver spaced longitudinally of the feeder from the driver first recited, said drivers being arranged to move the trough assembly longitudinally relative to the base assembly without bending either assembly.

3. The feeder described in claim 2 wherein each driver includes an armature mounted to one assembly and a core mounted to the other assembly, said armature and said core being mounted as to be attracted or repelled generally parallel to the assemblies in a direction longitudinally of the feeder.

* * * * *